March 18, 1941.  R. H. STUART  2,235,340
BRAKING DEVICE
Filed Dec. 2, 1939    2 Sheets-Sheet 1

Inventor
R. H. Stuart.

By Clarence A. O'Brien
and Hyman Berman
Attorneys

March 18, 1941.     R. H. STUART     2,235,340
BRAKING DEVICE
Filed Dec. 2, 1939     2 Sheets-Sheet 2
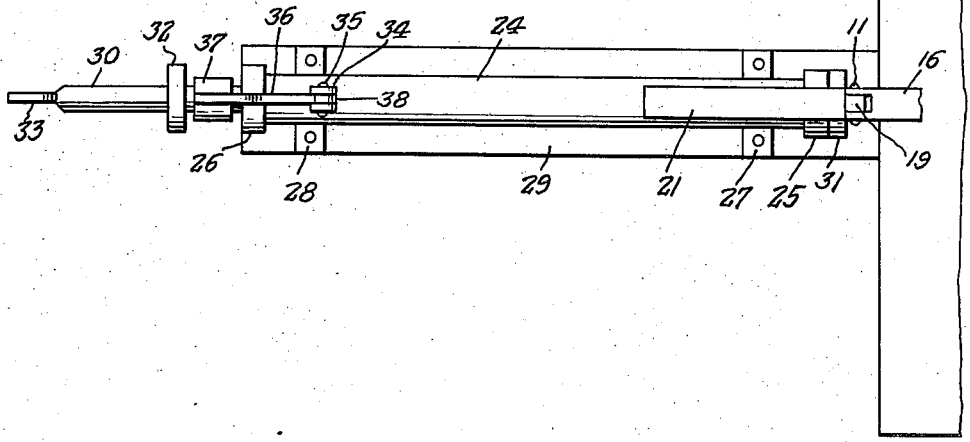
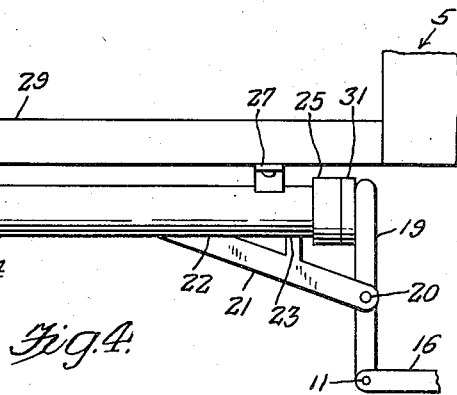
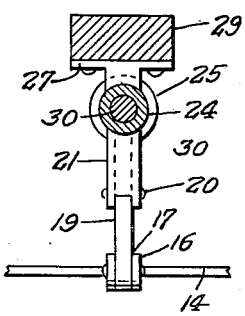
Inventor
R. H. Stuart,
By Clarence A. O'Brien
and Hyman Berman
Attorneys Patented Mar. 18, 1941

2,235,340

UNITED STATES PATENT OFFICE 2,235,340

BRAKING DEVICE

Robert H. Stuart, Varnado, La., assignor of one-half to Ruven O. Smith, Varnado, La.

Application December 2, 1939, Serial No. 307,320

1 Claim. (Cl. 188—142)

My invention relates generally to vehicle braking means and especially to braking means for trailers, and the principal object of my invention is to provide automatic brake applying mechanism for trailers, the mechanism being arranged to function under the influence of the momentum of the trailer when the trailer momentum exceeds that of the draft vehicle, as when the brakes are applied on the latter.

Other important objects and advantages of my invention will be apparent from a reading of the following description taken in connection with the drawings, wherein for purposes of illustration I have shown a preferred embodiment of my invention.

In the drawings:

Figure 2 is a fragmentary enlarged bottom plan view of Figure 1.

Figure 4 is a view similar to Figure 3 but showing the brake mechanism held in an unoperated condition by adjustment of the stop element.

Figure 5 is an enlarged transverse vertical sectional view taken through Figure 1 approximately on the line 5—5 and looking toward the right in the direction of the arrow.

Figure 1:
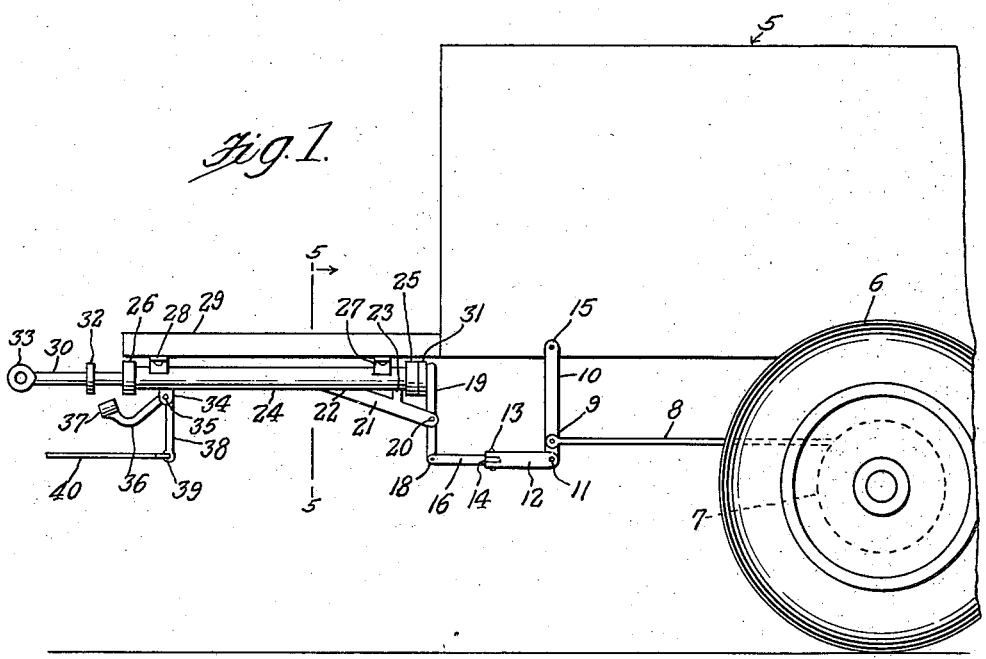
Figure 1 is a general side elevational view of the forepart of a trailer showing the braking mechanism installed thereon and in an unoperated condition.
Figure 3:
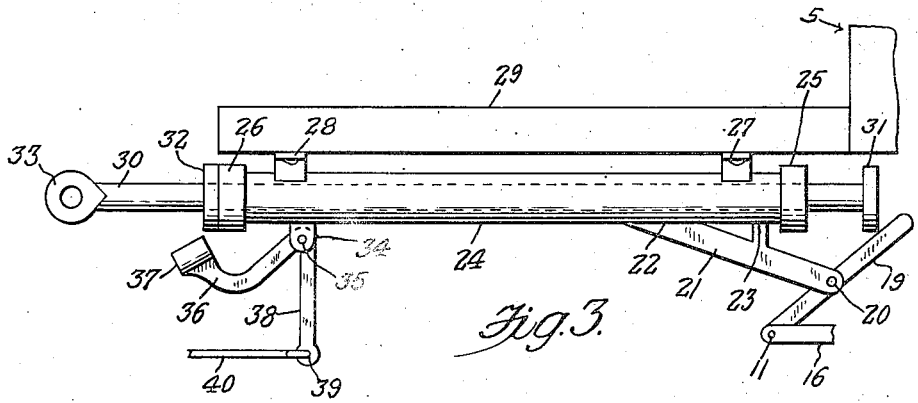
Figure 3 is a fragmentary enlarged side elevational view similar to Figure 1 but showing the brake mechanism in a fully operated condition.
Figure 6:
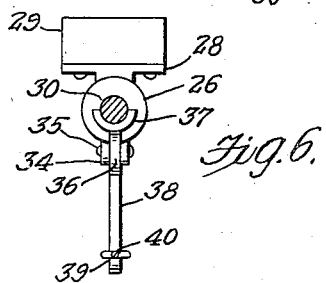
Figure 6 is a similar sectional view taken through Figure 4 approximately on the line 6—6 and looking toward the right in the direction of the arrow.

Referring in detail to the drawings, the numeral 5 generally designates a typical trailer having ground wheels 6 in conjunction with which brake drums 7 are provided with brake mechanism (not shown) operated by brake rods 8 pivoted as indicated by the numeral 9 to brake rod hangers 10 which are pivotally connected at 11 to the rear end of links 12 which are pivoted on a vertical axis as indicated by the numeral 13 to the opposite ends of an equalizer bar 14. The upper ends of the hanger bars 10 are pivoted to a support part of the trailer as indicated by the numeral 15. Pivoted to the middle of the equalizer bar 14 and extending forwardly therefrom is the link 16 which is bifurcated as indicated by the numeral 17 in Figure 5 and connected by a pivot 18 to the lower end of the lever 19 which is pivoted intermediate its ends as indicated by the numeral 20 between ears on the rear and depressed end of the bracket 21 which is connected as by welding at the two places indicated respectively by the numerals 22 and 23 to the bottom of the adjacent end of an outer pipe 24 which has a stop-nut 25 at its rear end and a similar stop nut 26 threaded on its front end with suitable brackets 27 and 28 suitably secured to the top side of the pipe 24 as by welding, the brackets being bolted or otherwise suitably secured to a horizontal support member 29 on the front part of the trailer. Slidably telescoped in the outer pipe 24 is the inner pipe 30 which has an annular stop 31 at its rear end adapted to engage the stop-nut 25 in the unoperated position of the device, shown in Figure 4, in which condition the front stop 32 is spaced forwardly from the stop 26. The front end of the inner pipe 30 has an eye 33 located in a vertical plane for attachment to the draft vehicle (not shown) in an obvious manner. A bracket 34 comprising a pair of ears carrying the pivot 35 is secured by suitable means as by welding to the bottom of the outer pipe 24 adjacent the front end thereof and on the pivot 35 turns the bellcrank which includes the upper curved arm 36 which is provided at its forward end with an arcuate shoe 37 for interposition between the front stop-nut 26 on the outer pipe and the front annular stop 32 on the inner pipe 30 so as to prevent substantial movement of the inner pipe 30 beyond a predetermined point rearwardly, thereby preventing application of the brakes of the trailer when the trailer is to be backed up by reversing of the draft vehicle. The other arm 38 of the bellcrank depends upon the rear end of the arm 36 and is connected at its lower end as indicated by the numeral 39 to an operating cable or rod 40 which extends forwardly to the draft vehicle for operation by the driver thereof. The weight of the upper arm 36 of the bellcrank is sufficient to normally keep the upper arm 36 in the depressed position indicated in Figure 3 in which this device is inoperative. However, a forward pull on the rod or cable 40 by the driver of the draft vehicle raises the arm 36 and places the same in the operative position shown in Figure 4 when it is desired to prevent rearward movement of the inner pipe 30 and consequent operation or application of the trailer brakes while backing the trailer.

It is believed obvious that permitted the freedom to slide rearwardly in the outer pipe 24 the stop 31 on the rear end of the inner pipe 30 will, whenever the trailer overruns the draft vehicle, press on the upper end of the lever 19 so as to swing the lower end thereof forwardly and in consequence draw the brake operating rods forwardly and apply the brakes of the trailer.

It is obvious that the construction of the device of the invention and the ready availability of the necessary materials at a low figure, provides for an economical and efficient device of the character described.

Although I have shown and described herein a preferred embodiment of my invention, it is to be definitely understood that I do not desire to limit the application of the invention thereto except as may be required by the scope of the subjoined claim.

Having described the invention, what is claimed as new is:

In a brake mechanism for operating the brakes of a trailer vehicle, a draw bar adapted to be connected by its front end to a draft vehicle, a tubular member fixed on the trailer vehicle in a horizontal position with said draw bar slidably supported therethrough, an operating lever, a bracket on said tubular member pivotally supporting said operating lever at a point intermediate the ends of the operating lever with one end of said operating lever positioned to be engaged by the rear end of said draw bar whenever the trailer vehicle overruns the draft vehicle, a stop on the rear end of the drawbar for engaging the lever and for engaging the rear end of the tubular member when the drawbar is moved forwardly to limit forward movement of the drawbar, a second stop on the drawbar for engaging the front end of the tubular member when the trailer overruns the draft vehicle, a bellcrank lever pivoted to a front portion of the tubular member and having a shoe at one end for fitting between the front stop of the drawbar and the front end of the tubular member, said shoe normally causing the bellcrank to move to a position where the shoe is in inoperative position and a member connected to the other end of the lever for moving the lever to a position where the shoe will engage the drawbar between the stop and the front end of the tubular member to prevent rearward movement of the drawbar sufficient to operate the trailer brakes.

ROBERT H. STUART.